(12) United States Patent
Pan et al.

(10) Patent No.: US 11,975,376 B2
(45) Date of Patent: May 7, 2024

(54) FLUID BULGING EQUIPMENT FOR THIN PLATE PARTS

(71) Applicant: FRD SCIENCE & TECHNOLOGY (JIANGSU) CO., LTD., Jiangsu (CN)

(72) Inventors: Hongming Pan, Changzhou (CN); Heng Xiao, Changzhou (CN); Weimin Shi, Changzhou (CN)

(73) Assignee: FRD SCIENCE & TECHNOLOGY (JIANGSU) CO., LTD., Changzhou (CN)

( * ) Notice: Subject to any disclaimer, the term of this patent is extended or adjusted under 35 U.S.C. 154(b) by 0 days.

(21) Appl. No.: 18/321,985

(22) Filed: May 23, 2023

(65) Prior Publication Data

US 2023/0294154 A1   Sep. 21, 2023

Related U.S. Application Data

(63) Continuation-in-part of application No. PCT/CN2021/122575, filed on Oct. 8, 2021.

(30) Foreign Application Priority Data

Nov. 23, 2020   (CN) ......................... 202011321551.X

(51) Int. Cl.
*B21D 26/021* (2011.01)
*F15B 21/00* (2006.01)

(52) U.S. Cl.
CPC ............ *B21D 26/021* (2013.01); *F15B 21/00* (2013.01)

(58) Field of Classification Search
CPC ...... B21D 26/021; B21D 26/025; F15B 21/00
See application file for complete search history.

(56) References Cited

U.S. PATENT DOCUMENTS 3,350,905 A * 11/1967 Ogura .................. B21D 26/037
72/62
6,006,567 A * 12/1999 Brown ................. B21D 26/045
72/58

(Continued)

FOREIGN PATENT DOCUMENTS

CN   101104185 A   1/2008
CN   101927299 A   12/2010

(Continued)

OTHER PUBLICATIONS

First Office Action in Chinese Application No. 202011321551.X dated Mar. 10, 2022, 14 pages.

(Continued)

*Primary Examiner* — Dustin T Nguyen
(74) *Attorney, Agent, or Firm* — Runzhi Lai

(57) ABSTRACT

The embodiment of the present disclosure provides fluid bulging equipment for thin plate parts, which includes a main mechanism, a left mold opening mechanism and a right mold opening mechanism located on both sides of the main mechanism, a left mobile working platform, and a right mobile working platform. The main mechanism includes a main frame and a main oil cylinder located under the main frame. The main oil cylinder is connected to a master cylinder mold-locked booster cylinder through an oil circuit block. A hydraulic control system is arranged above the main mechanism. An ultra-high pressure generating device is arranged in the hydraulic control system. The ultra-high pressure generating device is connected to the master cylinder mold-locked booster cylinder through a pipeline. The hydraulic control system is also connected to the left mold opening mechanism and the right mold opening mechanism.

4 Claims, 4 Drawing Sheets

(56) References Cited

U.S. PATENT DOCUMENTS

| | | | | |
|---|---|---|---|---|
| 6,530,252 B1 * | 3/2003 | Hashimoto | ......... | B21D 26/039 |
| | | | | 72/58 |
| 8,024,954 B2 * | 9/2011 | Melgaard | ............. | B21C 37/292 |
| | | | | 72/370.27 |
| 10,773,292 B2 * | 9/2020 | Saika | .................. | B21D 26/041 |
| 2015/0292154 A1 * | 10/2015 | Zheng | .................... | D21F 7/006 |
| | | | | 162/253 |

FOREIGN PATENT DOCUMENTS

| | | | |
|---|---|---|---|
| CN | 102125953 | A | 7/2011 |
| CN | 202318997 | U | 7/2012 |
| CN | 103111507 | A | 5/2013 |
| CN | 204182748 | U | 3/2015 |
| CN | 206083537 | U | 4/2017 |
| CN | 107030171 | A | 8/2017 |
| CN | 206898159 | U | 1/2018 |
| CN | 107971382 | A | 5/2018 |
| CN | 110016540 | A | 7/2019 |
| CN | 111389988 | A | 7/2020 |
| CN | 112570541 | A | 3/2021 |
| DE | 3418691 | A1 | 2/1986 |
| FR | 2942153 | A1 | 8/2010 |
| IN | 109604411 | A | 4/2019 |
| JP | 2000210724 | A | 8/2000 |
| JP | 2005144549 | A | 6/2005 |

OTHER PUBLICATIONS

Decision to Grant a Patent in Chinese Application No. 202011321551.X dated Apr. 28, 2022, 3 pages.

International Search Report in PCT/CN2021/122575 dated Dec. 23, 2021, 7 pages.

Written Opinion in PCT/CN2021/122575 dated Dec. 23, 2021, 8 pages.

* cited by examiner

FLUID BULGING EQUIPMENT FOR THIN PLATE PARTS

CROSS-REFERENCE TO RELATED APPLICATIONS

This application is a continuation-in-part of International Patent Application PCT/CN2021/122575, filed on Oct. 8, 2021, which claims priority of the Chinese Patent Application No. 202011321551. X, filed on Nov. 23, 2020, the entire contents of each of which are hereby incorporated by reference.

TECHNICAL FIELD

The present disclosure relates to the field of thin plate processing, in particular to fluid bulging equipment for thin plate parts.

BACKGROUND

In fields such as new energy vehicle batteries and 5G communication base stations that require thin plate parts to dissipate heat, heat dissipation cold plates are basically formed by stamping or fluid high-pressure bulging. The fluid bulging equipment basically adopts the same standard hydraulic press as the stamping equipment. With an increasing area of heat dissipation cold plate products and a relatively large bulging force required, the cost of using general-purpose equipment is particularly high, the efficiency is relatively low, and many general-purpose auxiliary components (e.g., drawing cylinders) are not used, resulting in waste of investment.

Existing fluid bulging equipment basically use the same standard hydraulic press as the stamping equipment, fixing a lower mold of a bulging mold on a tooling table and fixing an upper mold on a slider of the standard hydraulic press, clamping the upper and lower molds through the downward movement of the slider of the hydraulic press. The pressure is maintained by delaying or closing a one-way valve, and a bulging operation is carried out. Then the pressure is withdrawn, the slider moves up, the upper mold moves up, and the mold is opened for releasing the product.

Therefore, it is desired to provide fluid bulging equipment for thin plate parts, which can increase the use of the general-purpose auxiliary components, reduce costs, and improve production efficiency.

SUMMARY

The embodiments of the present disclosure intend to provide fluid bulging equipment for thin plate parts with low equipment cost and high bulging efficiency to overcome deficiencies in the prior art.

One or more embodiments of the present disclosure provide fluid bulging equipment for thin plate parts. The equipment includes a main mechanism, a left mold opening mechanism and a right mobile working platform located on both sides of the main mechanism, a left mobile working platform, and a right mold opening mechanism. The main mechanism includes a main frame and a main oil cylinder located below the main frame. The main oil cylinder is connected to a master cylinder mold-locked booster cylinder through the oil circuit block. A hydraulic control system is arranged above the main mechanism, and an ultra-high pressure generating device is arranged in the hydraulic control system. The ultra-high pressure generating device is connected to the master cylinder mold-locked booster cylinder through a pipeline. The hydraulic control system is connected to the left mold opening mechanism and the right mold opening mechanism. The left mold opening mechanism and the right mold opening mechanism respectively include a gantry, a hydraulic cylinder is installed on the gantry, a slider is connected to an end of the hydraulic cylinder, and a hook is connected to a bottom of the slider, the slider being connected to a displacement sensor. The left mobile working platform and the right mobile working platform are installed on a bottom plate below the main frame, the bottom plate is connected to a slide rail, the left mobile working platform and the right mobile working platform are respectively connected to a servo motor, and the servo motor drives the left mobile working platform and the right mobile working platform to reciprocate along the slide rail. The main oil cylinder is composed of a plurality of small oil cylinders, and bottoms of the left mobile working platform and the right mobile working platform are respectively provided with a plurality of through holes matching the small oil cylinders.

In some embodiments, the hook is a T-shaped hook or an L-shaped hook.

In some embodiments, a set of protective plates or a set of protective gratings are respectively provided on the both sides of the main mechanism, and the set of protective plates or the set of protective gratings is symmetrically arranged on both sides of the slide rail.

In some embodiments, the main frame is connected and fixed to an embedded part in a pit through bolts.

Some embodiments of the present disclosure include at least the following beneficial effects:
(1) the fluid bulging equipment in the present disclosure is mainly used in the process of thin plate forming, suitable for a series of projects in new energy vehicle batteries, 5G communication base stations, and other fields that require thin plate parts for heat dissipation, addressing problems of existing fluid bulging equipment, such as particularly high cost, relatively low efficiency, many auxiliary components not being used, and wasted investment;
(2) the fluid bulging equipment in the present disclosure is mainly composed of the main mechanism, the ultra-high pressure generating device, the left mold opening mechanism, the right mold opening mechanism, the hydraulic control system, the left mobile working platform, and the right mobile working platform. The main oil cylinder drives a mold clamping force through a booster cylinder with adjustable pressure and a 2% display accuracy. The pressure can be maintained for a long time, and the efficiency is significantly increased by at least 6 times, from 20 pieces/h for existing equipment to 120 pieces/h or more for the new equipment;
(3) the cost of the fluid bulging equipment in the present disclosure is about 40% lower compared with other equipment under the same tonnage pressure.
(4) an automatic double-station operation can be realized through a general-purpose mold base and a move-in and move-out device, resulting in a high degree of automation; and
(5) the foundation of the equipment is relatively shallow, and the height above the ground is low, which can meet a requirement for installation of existing standard factory buildings.

BRIEF DESCRIPTION OF THE DRAWINGS

The present disclosure may be further described by way of exemplary embodiments, which may be described in detail with reference to drawings. These embodiments are not limiting, and in these embodiments, the same numbers refer to the same structures, wherein.

Figure 1:
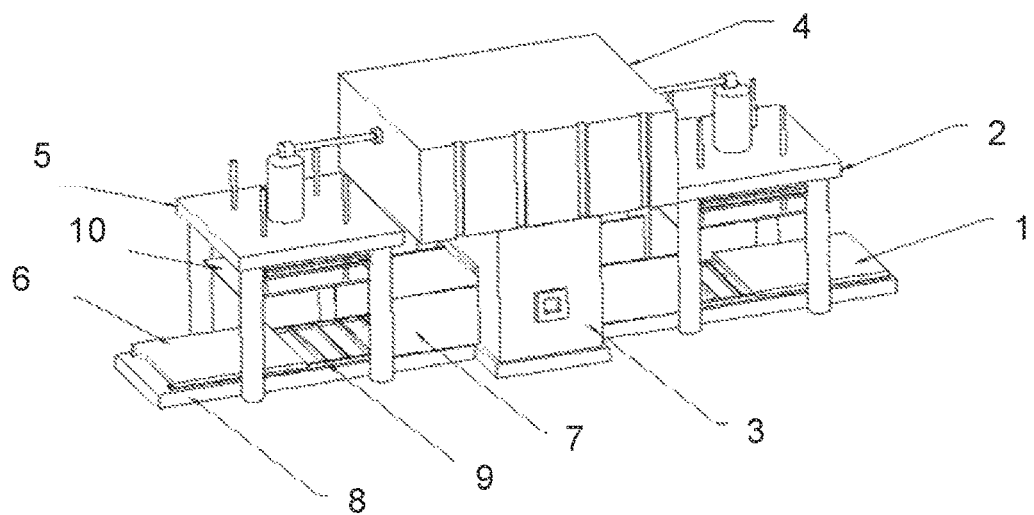
FIG. 1 is a schematic diagram of an exemplary structure of fluid bulging equipment for thin plate parts according to some embodiments of the present disclosure.

The drawings include a right mobile working platform 1, a left mobile working platform 6, a right mold opening mechanism 2, a left mold opening mechanism 5, a main mechanism 3, a hydraulic control system 4, protective plates or protection gratings 7, a bottom plate 8, a slide rail 9, a slider 10, an L-shaped hook 11, a T-shaped hook 12, a pit 13, a main frame 31, a main oil cylinder 32, an oil circuit block 33, a master cylinder mold-locked booster cylinder 34, a bolt 35, an embedded part 36, an upper mold 37, a lower mold 38, a small oil cylinder 39, an ultra-high pressure generating device 41, a pipeline 42, a gantry 51, a hydraulic cylinder 52, a servo motor 53, a displacement sensor 54, and a through hole 55.

DETAILED DESCRIPTION

In order to illustrate the technical solutions of the embodiments of the present disclosure more clearly, the following briefly introduces the accompanying drawings used in the descriptions of the embodiments. Obviously, the drawings described below are only some examples or embodiments of the present disclosure. Those skilled in the art, without further creative efforts, may apply the present disclosure to other similar scenarios according to these drawings. Unless obvious from the locale or otherwise specified, the same reference numbers in the figures represent the same structure or operation.

As shown in the present disclosure and the claims, the singular forms "a," "an," and "the" may be intended to include the plural forms as well, unless the context clearly indicates otherwise. Generally speaking, the terms "comprising" and "including" only imply that the clearly identified steps and elements are included, and these steps and elements may not constitute an exclusive list, and methods or equipment may also include other steps or elements.

Figure 3:
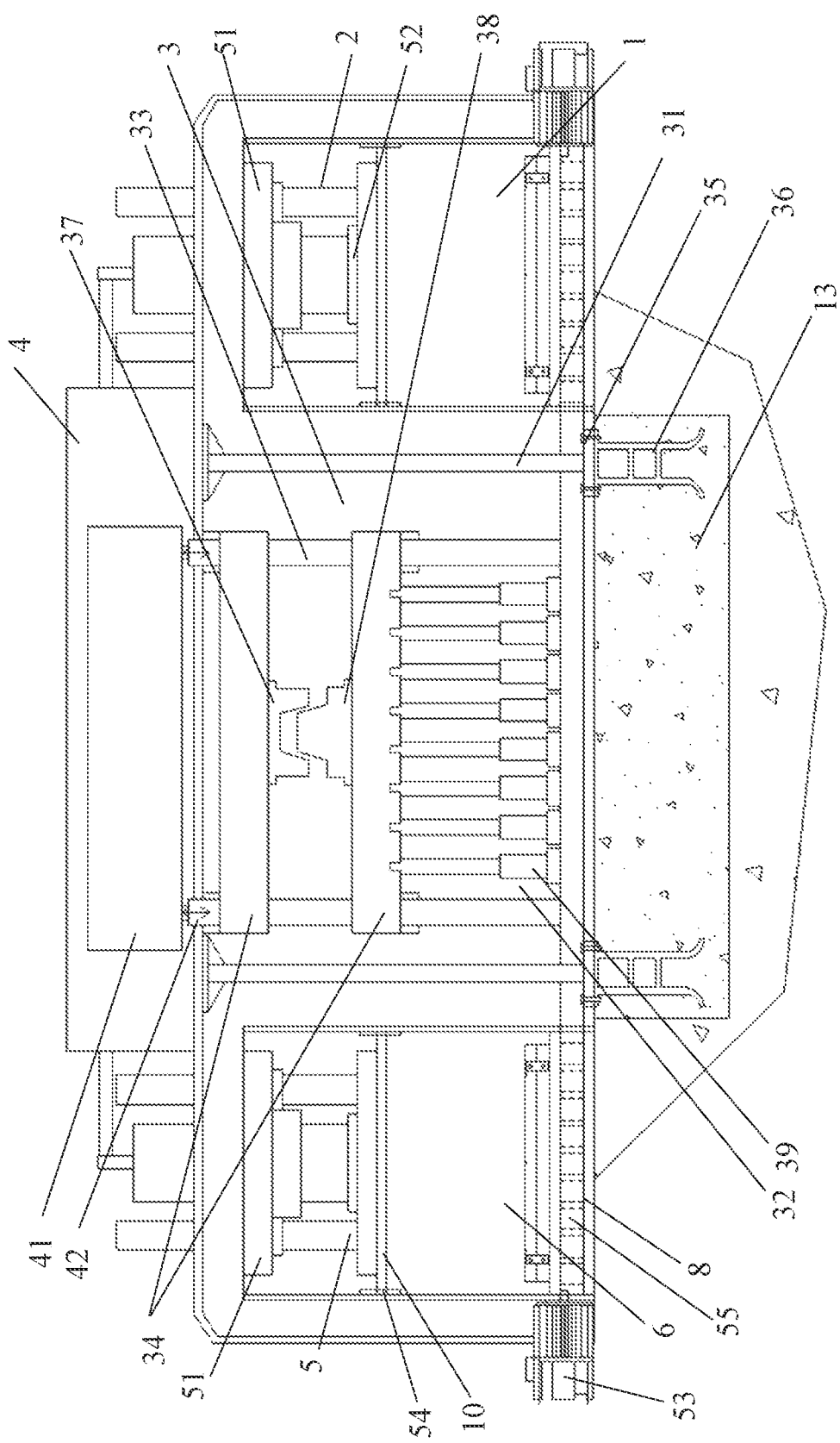
FIG. 3 is a schematic diagram of an exemplary structure of fluid bulging equipment for thin plate parts according to some embodiments of the present disclosure.

FIG. 1 is a schematic diagram of an exemplary structure of fluid bulging equipment for thin plate parts according to some embodiments of the present disclosure. FIG. 3 is a schematic diagram of an exemplary structure of fluid bulging equipment for thin plate parts according to some embodiments of the present disclosure. As shown in FIGS. 1 and 3, the fluid bulging equipment for thin plate parts (hereinafter referred to as the bulging equipment) may include the main mechanism 3, the left mold opening mechanism 5 and the right mold opening mechanism 2 located on both sides of the main mechanism 3, the left mobile working platform 6, and the right mobile working platform 1.

The main mechanism 3 refers to a main mechanism for performing bulging operations on the thin plate parts.

In some embodiments, the main mechanism 3 may include a main frame 31 and a main oil cylinder 32 located below the main frame 31.

In some embodiments, the main frame 31 may be manufactured by casting, steel plate splicing, or other processes, which is not limited here.

In some embodiments, the main frame 31 may be connected and fixed to an embedded part 36 in a pit 13 through bolts 35, which can make the foundation of the equipment relatively shallow, and the height above the ground is low, thereby meeting the requirement for installation of existing standard factory buildings.

In some embodiments, the main frame may also be connected and fixed to the embedded part in the pit through other manners, which is not limited here.

The main oil cylinder refers to a hydraulic actuator that converts hydraulic energy into mechanical energy and performs a linear reciprocating motion.

In some embodiments, the main oil cylinder 32 may be connected to a master cylinder mold-locked booster cylinder 34 through an oil circuit block 33.

The master cylinder mold-locked booster cylinder refers to a part that may lock a mold and increase pressure. The main oil cylinder 32 may drive a mold clamping force through the master cylinder mold-locked booster cylinder 34 with adjustable pressure and a 2% display accuracy and maintain the pressure for a long time.

In some embodiments, the main oil cylinder 32 may be composed of a plurality of small oil cylinders 39. Bottoms of the left mobile working platform 6 and the right mobile working platform 1 are respectively provided with a plurality of through holes 55 matching the small oil cylinders 39. The main oil cylinder 32 exerts pressure on a lower mold 38 through the through holes 55 at the bottoms of the left mobile working platform 6 and the right mobile working platform 1, and an upper end of an upper mold 37 is pressed against a lower surface of the main frame 31, thereby compressing the mold to realize bulging and molding of a part. With this structural design, the mold can be evenly pressed, thereby improving the quality of the bulging.

In some embodiments, the main oil cylinder 32 may be located in a pit 13 after the equipment is installed.

In some embodiments, the hydraulic control system 4 is arranged above the main mechanism 3. The hydraulic control system 4 is mainly used to control a rapid operation of the main oil cylinder 32, the left mold opening mechanism 5, the right mold opening mechanism 2, the master cylinder mold-locked booster cylinder 34, or the like.

In some embodiments, an ultra-high pressure generating device 41 may be arranged inside the hydraulic control system 4, and the ultra-high pressure generating device 41 may be connected to the master cylinder mold-locked booster cylinder 34 through a pipeline 42. In some embodiments, the hydraulic control system 4 may also be connected to the left mold opening mechanism 5 and the right mold opening mechanism 2.

The hydraulic control system in the present disclosure may be a hydraulic control system of a standard hydraulic press that is the same as that of stamping equipment, and the main oil cylinder may use general-purpose equipment such as a drawing cylinder. By using the general-purpose equipment, the investment cost of the bulging equipment is greatly reduced, and the waste of investment can be avoided at the same time.

In some embodiments, a set of protective plates or protective gratings 7 is respectively provided on both sides of the main mechanism 3, and the set of protective plates or protective gratings 7 is symmetrically arranged on both sides of the slide rail 9. As shown in FIG. 1, the set of protective plates or protective gratings 7 may be symmetrically arranged on the both sides of the slide rail 9, with one end of the set arranged on the mold opening mechanism and the other end arranged on the main mechanism. By arranging the protective plates or protective gratings, it is possible to avoid people entering a track during a reciprocating motion of the mobile working platform (including the left mobile working platform 6 and the right mobile working platform 1) along the slide rail 9, thereby improving production safety.

In some embodiments, the left mold opening mechanism 5 and the right mold opening mechanism 2 respectively include a gantry 51, and a hydraulic cylinder 52 is installed on the gantry 51. The slider 10 is connected to an end of the hydraulic cylinder 52, and a hook is connected to a bottom of the slider 10, the slider 10 being connected to a displacement sensor 54.

In some embodiments, the stroke control of the slider 10 may be digitally displayed and controlled through the displacement sensor 54. In some embodiments, an arbitrary position is preset in a stroke area, so that the slider 10 may transition smoothly during a shifting of operation without shocks. By setting the displacement sensor 54, the stroke of the slider 10 may be controlled to ensure the slider 10 work safely within the stroke area.

The slider 10 may take a variety of forms. For example, the slider 10 may be a columnar structure, or the like. The form of the slider is only an illustration, and does not constitute a limitation to the implementation.

Figure 2:
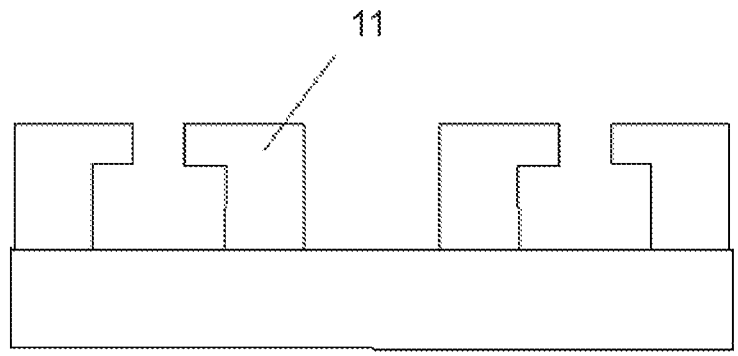
FIG. 2 is a schematic diagram of an example structure of an L-shaped hook in a left mold opening mechanism and in a right mold opening mechanism according to some embodiments of the present disclosure.
Figure 4:
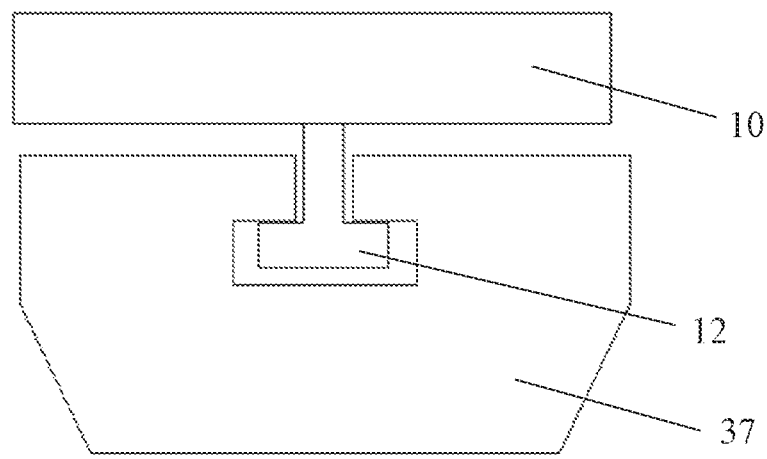
FIG. 4 is a schematic diagram of an example structure of a T-shaped hook in a left mold opening mechanism and in a right mold opening mechanism according to some embodiments of the present disclosure.

In some embodiments, the hook may be a T-shaped hook 12 or an L-shaped hook 11, as shown in FIGS. 2 and 4. The cooperative use of the slider 10 and the hook is conducive to mold opening, mold clamping, and rapid motion.

In some embodiments, there is a structure matching the shape of the hook on the upper mold 37. When the hook is T-shaped, there is an L-shaped block on the upper mold 37. When the hook is L-shaped, there is a T-shaped block on the upper mold to insert into the hook to achieve a connection between the hook and the upper mold. As shown in FIG. 2, the L-shaped hook 11 may cooperate with the T-shaped block on the upper mold to realize the connection between the hook and the upper mold.

In some embodiments, the hook may also be other forms, which is not limited by the present disclosure.

In some embodiments, the left mobile working platform 6 and the right mobile working platform 1 may be installed on the bottom plate 8 which is below the main frame. The bottom plate 8 may be connected to the slide rail 9, and the left mobile working platform 6 and the right mobile working platform 1 may be connected to a servo motor 53, respectively. The servo motor 53 drives the bottom plate 8, the left mobile working platform 6 and the right mobile working platform 1 to reciprocate along the slide rail 9. The servo motor 53 is used to control the mobile working platforms with a high positioning accuracy, and at the same time, manual, automatic, and mold change operations may be performed.

In some embodiments, the mobile working platform may be a steel plate processing part with a sufficient rigidity and strength, and a processing accuracy is implemented according to relevant standards. In some embodiments, the mobile working platform may also be a processing part made of other materials, which is not limited by the present disclosure.

In some embodiments, the bottom plate 8 below the left mold opening mechanism 5, the right mold opening mechanism 2, the left mobile working platform 6, and the right mobile working platform 1, and racks of the slide rail 9 may adopt carbon dioxide gas shielded welding and may be processed after the welding. In some embodiments, the welding may also be performed in other ways, which is not limited here.

In some embodiments, the bulging equipment further includes an electrical cabinet placed at the upper rear of the bulging equipment. The electrical cabinet may be used for control systems such as axis controllers, servo systems, and low-voltage electrical appliances.

In some embodiments, a station corresponding to the main mechanism 3 may be a forming station, and a station below the left mold opening mechanism 5 and the right mold opening mechanism 2 may be a mold opening station. In some embodiments, the mold opening mechanism may be responsible for operations such as unloading, mold opening, and mold clamping, and the forming station may be responsible for operations such as mold locking, forming, and pressure maintaining.

In some embodiments, an operation mode of the bulging equipment may be an independent manual operation or an automatic inline operation. The bulging equipment realizes interlocking with other actions of a host through a sensor and a controller in an electrical cabinet.

In some embodiments, an exemplary process for the bulging equipment is as follows:
S1, placing a mold: fixing a lower mold of a bulging mold on the left mobile working platform; moving the left mobile working platform to a left mold opening station; and controlling a T-hook of the left mold opening mechanism downward, and putting the L-shaped block of the upper mold onto the T-hook;
S2, unloading and filling: moving a mold opening oil cylinder (such as the hydraulic cylinder of the left mold opening mechanism) up to open the mold, and after putting raw materials (such as thin plate parts) into the mold, moving the mold opening oil cylinder downward to clamp the mold; and
S3, stamping and forming: after clamping the mold, moving the left mobile working platform to the forming station to complete mold locking, pressure maintaining, forming, etc. The actions of the left and the right mold opening stations are repeated successively.

While the left mobile working platform is located at the forming station, the right mobile working platform performs the above steps S1-S3 synchronously. After the forming station completes the operations, the right mobile working platform then moves to the forming station. Through the repeated actions of the left and the right mold opening stations, the idle time of the forming station is shortened, and the bulging efficiency is greatly improved.

In some embodiments, the bulging equipment further includes a detection system. In some embodiments, the detection system may be used for abnormality detection of a bulging part and a bulging stage.

In some embodiments, the detection system may include ultrasound imaging equipment and a processor. The ultrasound imaging equipment may be arranged in the main mechanism 3 and configured to obtain ultrasound images of a processing part. The processor is configured to determine abnormal situations of the processing part and working parameters of the bulging stage.

In some embodiments, the processing part may be a semi-finished product. In some embodiments, the processing part may be a finished product.

In some embodiments, the ultrasound imaging equipment may be configured to obtain ultrasound images of the processing part. See below for more instructions on obtaining the ultrasound images.

The processor may be configured to process data and/or information obtained from other equipment or components of the system. The processor may execute program instructions based on the data, information, and processing results to perform one or more functions described in the present disclosure, for example, the processor may be configured to obtain the working parameters of the bulging stage. In some embodiments, the processor may include one or more sub-processing equipment (e.g., single-core processing equipment or multi-core processing equipment). Merely by way of example, the processor may include a central processing unit (CPU), an application-specific integrated circuit (ASIC), etc., or any combination thereof.

Some embodiments of the present disclosure also provide a method for controlling the fluid bulging equipment for thin plate parts. The method may be implemented based on the fluid bulging equipment for thin plate parts and executed by the processor. In some embodiments, the processor may obtain a first ultrasound image of the processing part based on the ultrasound imaging equipment; and determine the abnormal situations of the processing part based on the first ultrasound image and a reference image.

The first ultrasound image refers to an ultrasound image obtained after the bulging stage is completed.

In some embodiments, the bulging stage may include at least one of a forming stage and a shaping stage. The forming stage refers to a stage advancing loading of a bulging fluid according to a set fluid loading curve, and pressurizing a raw material through the fluid to make the shape of the raw material basically conform to the mold after the upper mold and the lower mold are clamped. The shaping stage refers to a stage in which the pressure is continued to be increased so that the shape of the raw material is formed into a required part by completely fitting the mold. In some embodiments, completion of the bulging stage may refer to the end of the shaping stage.

The ultrasound imaging equipment may obtain the first ultrasound image of the processing part in various ways. For example, the ultrasound imaging equipment may obtain ultrasound images of the processing part from different angles.

In some embodiments, the processor may determine ultrasound parameters of the ultrasound imaging equipment based on working parameters of the bulging stage; and obtaining the first ultrasound image by the ultrasound imaging equipment based on the ultrasound parameters.

In some embodiments, the working parameters of the bulging stage include at least one of an execution time of the forming stage and an execution time of the shaping stage.

In some embodiments, the working parameters of the bulging stage may also include a mold clamping force of the bulging equipment, the pressure of pressurization and pressure maintaining, a duration of pressurization and pressure maintaining, or the like.

In some embodiments, the ultrasound parameters may include an ultrasound frequency. The higher the ultrasound frequency, the higher the imaging resolution and accuracy of the ultrasound imaging equipment.

In some embodiments, the processor may determine the ultrasound parameters of the ultrasound imaging equipment through a preset rule based on the working parameters of a current bulging stage. In some embodiments, the preset rule may be: the greater the mold clamping force of the bulging stage, the greater the pressure of pressurization and pressure maintaining, and the longer the duration of pressurization and pressure maintaining, the more likely an abnormality may occur in the bulging stage, and the ultrasound frequency of the ultrasound imaging equipment may be set higher.

Working parameters of different bulging stages may be different, and probabilities of abnormality occurring in different stages are different. In some embodiments of the present disclosure, determining the ultrasound parameters of the ultrasound imaging at the bulging stage through the working parameters of the bulging stage may improve a detection accuracy by adopting more suitable ultrasound parameters according to actual situations of the bulging stage.

The reference image refers to an ultrasound image in the bulging stage with no abnormal situation. The reference image may be determined in various ways. For example, the reference image may be determined by an experimental simulation. As another example, an ultrasound image without abnormality in a historical bulging stage may be used as the reference image.

In some embodiments, the abnormal situation of the processing part may include but is not limited to, no abnormality, insufficient bulging, deformation, displacement, or the like.

In some embodiments, the processor may determine the abnormal situation of the processing part in various ways based on the first ultrasound image and the reference image. For example, the processor may compare the first ultrasound image with the reference image, and when the first ultrasound image is different from the reference image, it may be determined that there is an abnormality in the processing part. As another example, the processor may compare and analyze the first ultrasound image and the reference image to determine the abnormal situation of the processing part.

In some embodiments, the processor may determine at least one positioning point in the first ultrasound image that satisfies a preset count condition based on at least one preset positioning point and positioning features of the preset positioning point; aligning the first ultrasound image and the reference image based on the at least one positioning point; determining an image difference based on an aligned first ultrasound image and aligned reference image; and determining the abnormal situation of the processing part based on the image difference.

The preset positioning point refers to a preset point for determining the positioning point in the first ultrasound image. For example, the preset positioning point may be a preset point at an image edge of the first ultrasound image, a preset point at a center of the first ultrasound image, or the like. There may be one or more preset positioning points. In some embodiments, a count of preset positioning points may satisfy a preset count condition. Correspondingly, the count of preset positioning points may be greater than or equal to a count of positioning points. When there is an unidentifiable preset positioning point, the positioning point may be determined in the first ultrasound image through other preset positioning points.

The positioning features refer to related features used to reflect the preset positioning point. In some embodiments, the positioning features may include shape features of the preset positioning point, location features of the preset positioning point in the image, or the like. For example, the shape features may include but are not limited to, figures, edges, circles, spots, etc. The location features may include a distance from an edge, a distance from a center, coordinates in the image, or the like.

The preset positioning point and its positioning features may be preset by a system or by an individual based on prior knowledge or historical data.

The preset count condition refers to a judgment condition related to quantity. In some embodiments, the preset count condition may be that the count of positioning points is greater than or equal to a count threshold. The count threshold may be a system default value, an empirical value, an artificially preset value, etc., or any combination thereof, and may be set according to actual requirements, which is not limited by the present disclosure.

In some embodiments, the processor may determine, based on the at least one preset positioning point and its positioning features, at least one positioning point satisfying the preset count condition in the first ultrasound image by means of a matching algorithm, or the like. Exemplary matching algorithms include but are not limited to, a template matching algorithm, or the like.

Aligning refers to arranging and adjusting a plurality of images in a certain way so that their locations, directions, and pixels are consistent. In some embodiments, the processor may align the first ultrasound image with the reference image based on the at least one positioning point according to the positioning features of the at least one positioning point. In some embodiments, the processor may also align the first ultrasound image with the reference image based on depth information.

The image difference may measure a similarity between different images. The image difference may be represented by numerical values or grades. The higher the numerical value or grade, the greater the difference and the lower the similarity between the different images.

The processor may determine the image difference between the aligned first ultrasound image and reference image in a plurality of ways. In some embodiments, the processor may calculate a Structural Similarity Index (SSIM) of the aligned first ultrasound image and reference image to determine the image difference between the two. Exemplary computing tools include but are not limited to, OpenCV, or the like. In some embodiments, the processor may also determine the image difference between the aligned first ultrasound image and reference image based on histograms of the two. The processor may also determine the image difference between the aligned first ultrasound image and reference image based on other manners, which is not limited by the present disclosure.

In some embodiments, the processor may determine the abnormal situations of the processing part in a plurality of ways based on the image difference. For example, the processor may determine the abnormal situation of the processing part based on prior knowledge or design requirements of the part. In some embodiments, the processor may also determine the abnormal situation of the processing part by looking up a preset comparison table based on the image difference. The preset comparison table may include correspondences between different image differences and different abnormal situations. The preset comparison table may be determined based on prior knowledge or historical data.

In some embodiments, the processor may also determine the abnormal situation of the processing part in other ways. In some embodiments, the processor may determine the abnormal situations based on the working parameters of the bulging stage. For example, if working pressure of the bulging stage is out of a range, an abnormal situation may occur.

In some embodiments of the present disclosure, by obtaining the ultrasound image of the processing part after the bulging stage is completed and determining the abnormal situation of the processing part, the abnormal situation of the processing part can be determined in a timely and automatic manner, and the efficiency of abnormality detection can be effectively improved.

In some embodiments, the processor may obtain a second ultrasound image sequence of the processing part through the ultrasound imaging equipment at a plurality of moments in the bulging stage; determine a future bulging feature of the processing part by processing the second ultrasound image sequence with a morphology prediction model; and determine a future abnormal situation of the processing part based on the future bulging feature.

The second ultrasound image sequence refers to a sequence including ultrasound images obtained at a plurality of moments in the bulging stage.

The ultrasound imaging equipment may obtain the second ultrasound image sequence of the processing part in various ways. For example, the ultrasound imaging equipment may obtain ultrasound images of the processing part at intervals. As another example, the ultrasound imaging equipment may obtain ultrasound images of the processing part from different angles at intervals.

In some embodiments, the morphology prediction model may be a machine learning model. In some embodiments, the morphology prediction model may be a machine learning model with a custom structure hereinafter. The morphology prediction model may also be a machine learning model with other structures, such as a neural network model.

In some embodiments, an input of the morphology prediction model may include the second ultrasound image sequence, the working parameters of the bulging stage, and an output may be the future bulging feature of the processing part. The future bulging feature refers to a predicted bulging feature of the processing part after the completion of the bulging stage. In some embodiments, the bulging feature may include a morphological change, or the like. See below for more on the morphological change.

In some embodiments, the morphology prediction model may include a feature extraction layer and a morphology prediction layer. In some embodiments, the feature extraction layer is used to process the second ultrasound image sequence to determine morphological change features. An output of the feature extraction layer may be used as an input of the morphology prediction layer. In some embodiments, the morphological prediction layer is used to process the morphological change features and the working parameters of the bulging stage to determine the future bulging feature. The morphological change features refer to features related to the morphological change, for example, features related to a volume change, features related to a shape change, etc. For more explanation on the working parameters of the bulging stage, please refer to the relevant description above.

In some embodiments, the feature extraction layer may be a model such as a long short-term memory (LSTM) model, and the morphological feature layer may be a model such as a convolutional neural network (CNN) model or a neural network (NN) model.

In some embodiments, the feature extraction layer and the morphology prediction layer may be obtained through joint training based on a plurality of first training samples with a first label.

In some embodiments, the first training sample may at least include a sample second ultrasound image sequence of a sample processing part and sample bulging parameters of a sample bulging stage. The first label may be a bulging feature of the sample processing part after the completion of the bulging stage. The first training sample may be obtained based on historical data. The first label may be obtained manually by labeling.

An exemplary joint training process includes: inputting the first training sample to the feature extraction layer, and obtaining morphological change features corresponding to the sample processing part output by the feature extraction layer; and inputting the morphological change features corresponding to the sample processing part and the sample bulging parameters from the feature extraction layer into the morphological prediction layer to obtain the future bulging feature output by the morphological prediction layer. During the joint training process, a loss function may be constructed based on the first label and output results of the morphology prediction layer, and parameters of the feature extraction layer and the morphology prediction layer may be iteratively updated based on the loss function at the same time until a preset condition is met and the training is completed. The preset condition may include one or more of the loss function being smaller than a threshold, the loss function converging, a training period reaching a threshold, or the like.

In some embodiments of the present disclosure, a bulging process of the part may be fully monitored by obtaining ultrasound images of the processing part at different moments in the bulging stage. Through the morphology prediction model, the future bulging feature of the processing part after the completion of the bulging stage can be determined more accurately, which is conducive to subsequent use of the future bulging feature to determine the future abnormal situation.

In some embodiments, the processor may determine the future abnormal situation of the processing part in a variety of ways based on the future bulging feature. In some embodiments, the processor may determine the future abnormal situation of the processing part based on a comparison of the future bulging feature with a reference bulging feature. For example, when a difference between the future bulging feature and the reference bulging feature exceeds a difference threshold, it may be determined that the future abnormal situation of the processing part are that there is an abnormality. The reference bulging feature refers to a bulging feature when there is no abnormality.

In some embodiments, the processor may also determine the future abnormal situation of the processing part through a vector database based on the future bulging feature.

The vector database refers to a database for storing, indexing, and querying vectors. In some embodiments, vectors in the vector database may include different reference feature vectors corresponding to different reference abnormal situations. In some embodiments, the reference feature vectors in the vector database may be constructed based on historical bulging features.

In some embodiments, the processor may construct a target feature vector based on the future bulging feature; determine a reference feature vector that meets a preset condition based on the target feature vector, and determine the reference feature vector meeting the preset condition as an associated feature vector through the vector database; and determine a reference abnormal situation corresponding to the associated feature vector as the future abnormal situation of the processing part. The preset condition may refer to a judgment condition for determining the associated feature vector. In some embodiments, the preset condition may include that a vector distance is smaller than a distance threshold, the vector distance is the smallest, or the like.

In some embodiments of the present disclosure, by determining the future abnormal situations of the processing part, it is conducive to adjusting the working parameters of the bulging stage based on the future abnormal situation, so as to effectively improve a qualified rate of finished products of the processing parts.

In some embodiments, the processor may adjust the mold clamping force based on the abnormal situation or the future abnormal situation of the processing part. For example, when there is a displacement, the mold clamping force may be increased. In some embodiments, a range of adjusting the mold clamping force may be determined by a system or by an individual based on prior knowledge or historical data.

In some embodiments of the present disclosure, the mold clamping force of the bulging equipment may be adjusted in time according to the abnormal situation of the processing part, so as to effectively improve the qualified rate of finished products of the processing parts.

In some embodiments, the processor may also determine an execution progress of the bulging stage through a progress assessment model based on the second ultrasound image sequence; and adjust the working parameters of the bulging stage based on the execution progress of the bulging stage.

In some embodiments, the progress assessment model may be a machine learning model. In some embodiments, the progress assessment model may be a machine learning model with a custom structure hereinafter. The progress assessment model may also be a machine learning model with other structures, such as a neural network model.

In some embodiments, an input of the progress assessment model may include the second ultrasound image sequence, and an output is the progress of the bulging stage.

In some embodiments, the progress assessment model may include a feature extraction layer and a progress assessment layer. An output of the feature extraction layer may be used as an input of the progress assessment layer. In some embodiments, the progress assessment layer is used to process the morphological change features to determine the progress of the bulging stage. The feature extraction layer of the progress assessment model is the same as that of the morphology prediction model, and more contents about the feature extraction layer can be found above.

In some embodiments, the progress assessment layer may be a CNN model, a NN model, etc.

In some embodiments, the feature extraction layer and the progress assessment layer may be obtained through joint training based on a plurality of second training samples with a second label.

In some embodiments, the second training sample may include at least the sample second ultrasound image sequence of the sample processing part obtained in the sample bulging stage. The second label may be an execution progress of the sample bulging stage. The second training sample may be obtained based on historical data. The second label may also be obtained manually by labeling. For example, images of a whole process from the beginning of the bulging to the completion of the bulging in the historical data may be obtained, and the execution progress may be marked according to the progress of the whole process.

An exemplary joint training process includes: inputting the second training sample to the feature extraction layer, and obtaining the morphological change features corresponding to the sample processing part output by the feature extraction layer; and inputting the morphological change features corresponding to the sample processing part and the sample bulging parameters from the feature extraction layer into the progress assessment layer to obtain the execution progress output by the progress assessment layer. During the joint training process, a loss function may be constructed based on the output of the second label and the progress evaluation layer, and parameters of the feature extraction layer and the progress evaluation layer may be iteratively updated based on the loss function at the same time until a preset condition is met and the training is completed. The preset condition may include one or more of the loss function being smaller than a threshold, the loss function converging, a training period reaching a threshold, or the like.

In some embodiments, the processor may adjust the working parameters of the bulging stage in various ways based on the execution progress. In some embodiments, the processor may adjust an execution time of the forming stage or the shaping stage based on the execution progress and a total execution time of the bulging stage. For example, the processor may calculate a time required until an end of the forming stage or the shaping stage based on the execution progress and a current elapsed time; and adjust the execution time of the forming stage or the shaping stage based on the time required.

In some embodiments of the present disclosure, the execution progress of the bulging stage is determined through the ultrasound images obtained in the bulging stage, which facilitates real-time adjustment of the working parameters of the bulging stage and better guarantees features of the finished products of the processing part, thereby improving the qualified rate of finished products and reducing a defective rate of products.

Having thus described the basic concepts, it may be rather apparent to those skilled in the art after reading this detailed disclosure that the foregoing detailed disclosure is intended to be presented by way of example only and is not limiting. Various alterations, improvements, and modifications may occur and are intended to those skilled in the art, though not expressly stated herein. These alterations, improvements, and modifications are intended to be suggested by this disclosure and are within the spirit and scope of the exemplary embodiments of the present disclosure.

Moreover, certain terminology has been used to describe embodiments of the present disclosure. For example, the terms "one embodiment," "an embodiment," and "some embodiments" mean that a particular feature, structure, or characteristic described in connection with the embodiment is included in at least one embodiment of the present disclosure. Therefore, it is emphasized and should be appreciated that two or more references to "an embodiment" or "one embodiment" or "an alternative embodiment" in various portions of this specification are not necessarily all referring to the same embodiment. Furthermore, the particular features, structures, or characteristics may be combined as suitable in one or more embodiments of the present disclosure.

Furthermore, the recited order of processing elements or sequences, or the use of numbers, letters, or other designations therefore, is not intended to limit the claimed processes and methods to any order except as may be specified in the claims. Although the above disclosure discusses through various examples what is currently considered to be a variety of useful embodiments of the disclosure, it is to be understood that such detail is solely for that purpose and that the appended claims are not limited to the disclosed embodiments, but, on the contrary, are intended to cover modifications and equivalent arrangements that are within the spirit and scope of the disclosed embodiments. For example, although the implementation of various components described above may be embodied in hardware equipment, it may also be implemented as a software only solution, e.g., an installation on an existing server or mobile equipment.

Similarly, it should be appreciated that in the foregoing description of embodiments of the present disclosure, various features are sometimes grouped together in a single embodiment, figure, or description thereof for the purpose of streamlining the disclosure aiding in the understanding of one or more of the various embodiments. This method of disclosure, however, is not to be interpreted as reflecting an intention that the claimed subject matter requires more features than are expressly recited in each claim. Rather, claimed subject matter may lie in less than all features of a single foregoing disclosed embodiment.

In some embodiments, numbers describing the number of ingredients and attributes are used. It should be understood that such numbers used for the description of the embodiments use the modifier "about", "approximately", or "substantially" in some examples. Unless otherwise stated, "about", "approximately", or "substantially" indicates that the number is allowed to vary by ±20%. Correspondingly, in some embodiments, the numerical parameters used in the description and claims are approximate values, and the approximate values may be changed according to the required characteristics of individual embodiments. In some embodiments, the numerical parameters should consider the prescribed effective digits and adopt the method of general digit retention. Although the numerical ranges and parameters used to confirm the breadth of the range in some embodiments of the present disclosure are approximate values, in specific embodiments, settings of such numerical values are as accurate as possible within a feasible range.

For each patent, patent application, patent application publication, or other materials cited in the present disclosure, such as articles, books, specifications, publications, documents, or the like, the entire contents of which are hereby incorporated into the present disclosure as a reference. The application history documents that are inconsistent or conflict with the content of the present disclosure are excluded, and the documents that restrict the broadest scope of the claims of the present disclosure (currently or later attached to the present disclosure) are also excluded. It should be noted that if there is any inconsistency or conflict between the description, definition, and/or use of terms in the auxiliary materials of the present disclosure and the content of the present disclosure, the description, definition, and/or use of terms in the present disclosure is subject to the present disclosure.

Finally, it should be understood that the embodiments described in the present disclosure are only used to illustrate the principles of the embodiments of the present disclosure. Other variations may also fall within the scope of the present disclosure. Therefore, as an example and not a limitation, alternative configurations of the embodiments of the present disclosure may be regarded as consistent with the teaching of the present disclosure. Accordingly, the embodiments of the present disclosure are not limited to the embodiments introduced and described in the present disclosure explicitly.

What is claimed is:

1. A fluid bulging equipment for thin plate parts, comprising a main mechanism, a left mold opening mechanism and a right mold opening mechanism located on both sides of the main mechanism, a left mobile working platform, and a right mobile working platform, wherein the main mechanism includes a main frame and a main oil cylinder located below the main frame, and the main oil cylinder is connected to a master cylinder mold-locked booster cylinder through an oil circuit block;

a hydraulic control system is arranged above the main mechanism, an ultra-high pressure generating device is arranged in the hydraulic control system, and the ultra-high pressure generating device is connected to the master cylinder mold-locked booster cylinder through a pipeline; the hydraulic control system is connected to the left mold opening mechanism and the right mold opening mechanism;

the left mold opening mechanism and the right mold opening mechanism respectively include a gantry, a hydraulic cylinder is installed on the gantry, a slider is connected to an end of the hydraulic cylinder, and a hook is connected to a bottom of the slider, the slider being connected to a displacement sensor;

the left mobile working platform and the right mobile working platform are installed on a bottom plate below the main frame, the bottom plate is connected to a slide rail, the left mobile working platform and the right mobile working platform are respectively connected to a servo motor, and the servo motor drives the left mobile working platform and the right mobile working platform to reciprocate along the slide rail; and the main oil cylinder is composed of a plurality of small oil cylinders, and bottoms of the left mobile working platform and the right mobile working platform are respectively provided with a plurality of through holes matching the small oil cylinders.

2. The fluid bulging equipment for thin plate parts according to claim 1, wherein the hook is a T-shaped hook or an L-shaped hook.

3. The fluid bulging equipment for thin plate parts according to claim 1, wherein a set of protective plates or a set of protective gratings is respectively arranged on the both sides of the main mechanism, and the set of protective plates or the set of protective gratings is arranged symmetrically on both sides of the slide rail, respectively.

4. The fluid bulging equipment for thin plate parts according to claim 1, wherein the main frame is connected and fixed to an embedded part in a pit through bolts.

* * * * *